United States Patent [19]

Hughes et al.

[11] 4,349,316

[45] Sep. 14, 1982

[54] TWIST CONTROL FOR HELICOPTER TAIL ROTOR PITCH CHANGE

[75] Inventors: Charles W. Hughes, Hurst; Keith W. Harvey; Walter G. O. Sonneborn, both of Fort Worth, all of Tex.

[73] Assignee: Textron, Inc., Providence, R.I.

[21] Appl. No.: 32,785

[22] Filed: Apr. 24, 1979

[51] Int. Cl.³ ............................................. B64C 27/38
[52] U.S. Cl. ................................ 416/104; 416/134 A; 416/141
[58] Field of Search ............... 416/104, 134 A, 138 A, 416/141, 226, 230 A

[56] References Cited

U.S. PATENT DOCUMENTS

| | | | |
|---|---|---|---|
| 2,627,929 | 2/1953 | Sikorsky | 416/104 |
| 2,934,152 | 4/1960 | Dauenhauer | 416/104 |
| 3,026,942 | 3/1962 | Cresap | 416/141 X |
| 3,193,019 | 7/1965 | Drees et al. | 416/140 A |
| 3,347,320 | 10/1967 | Cresap et al. | 416/104 |
| 3,457,997 | 7/1969 | Mackenzie et al. | |
| 3,484,174 | 12/1969 | McCoubrey | 416/226 X |
| 3,494,706 | 2/1970 | Gaffey et al. | 416/104 X |
| 3,765,267 | 10/1973 | Bourquardez et al. | 416/134 A X |
| 3,790,302 | 2/1974 | Pascher | 416/134 A |
| 3,874,820 | 4/1975 | Fenaughty | 416/226 |
| 4,037,988 | 7/1977 | Laird | 416/134 A X |

Primary Examiner—John M. Jillions
Attorney, Agent, or Firm—Richards, Harris & Medlock

[57] ABSTRACT

A control for a helicopter tail rotor where inboard twist sections on opposite sides of a central hub section are adjacent to pitch horns mounted outboard the margins of the twist sections and extend to a negative delta₃ connection point located at the virtual bending axis of each twist section. The rotor teeters on the tail mast with the span axis of the rotor at an angle of the order of 30° to 45° from the teetering axis.

7 Claims, 7 Drawing Figures

TWIST CONTROL FOR HELICOPTER TAIL ROTOR PITCH CHANGE

TECHNICAL FIELD

This invention relates to control of a bearingless tail rotor for a helicopter and, more particularly, to pitch change of a tail rotor which achieves stability in operation through inboard twist sections and a pitch horn-pitch link connection at a negative delta$_3$ at the out-of-plane bending axes of the twist sections and where the twist sections extend free and unobstructed from the hub to the pitch horn attachment point.

BACKGROUND ART

Rotary wing systems with conventional tail rotors employ bearings which lower the reliability and increase the maintenance and life cycle costs to undesirable levels. Heretofore, a tail rotor with flapping (teetering) freedom having an elastic pitch beam has been tested, but encountered instability in the cyclic mode involving primarily flapping/chord bending. There exists a need for a composite tail rotor which eliminates pitch change bearings and which eliminates an instability heretofore encountered between flapping and first chord natural frequencies and in which there is achieved a separation between the first torsion and second beam natural frequencies.

Certain aspects of the invention disclosed herein are described in copending application Ser. No. 32,763, filed Apr. 24, 1979, entitled "Bearingless Tail Rotor for Helicopters", U.S. Pat. No. 4,306,837.

DISCLOSURE OF THE INVENTION

The present invention involves control structure for a helicopter tail rotor having twist sections on opposite sides of a central hub section wherein pitch horns are mounted adjacent the outboard margins of said twist sections and extend to a negative delta$_3$ pitch link point located at the virtual bending axis of each of said twist sections. Preferably the rotor is mounted on structure for teetering the rotor about a teetering axis on a tail mast and wherein the span axis of the rotor is at an angle of the order of 30° to 45° from a line perpendicular to the teetering axis.

BRIEF DESCRIPTION OF DRAWINGS

A more complete understanding of the invention and its advantages will be apparent from the following Detailed Description taken in conjunction with the accompanying drawings in which.

DETAILED DESCRIPTION

Figure 1:
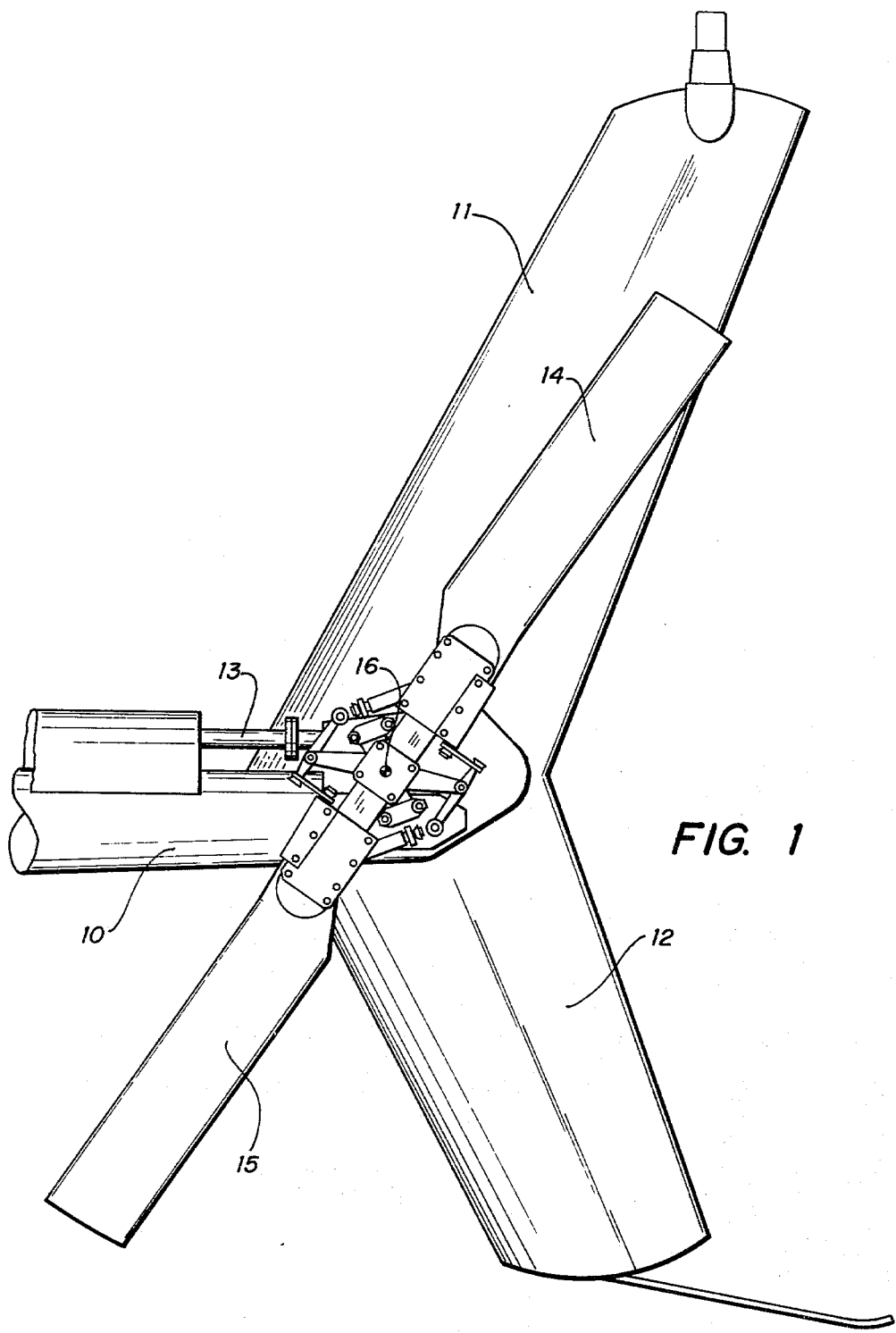
FIG. 1 is a side view of an installation embodying the tail rotor having twist sections.
Figure 2:
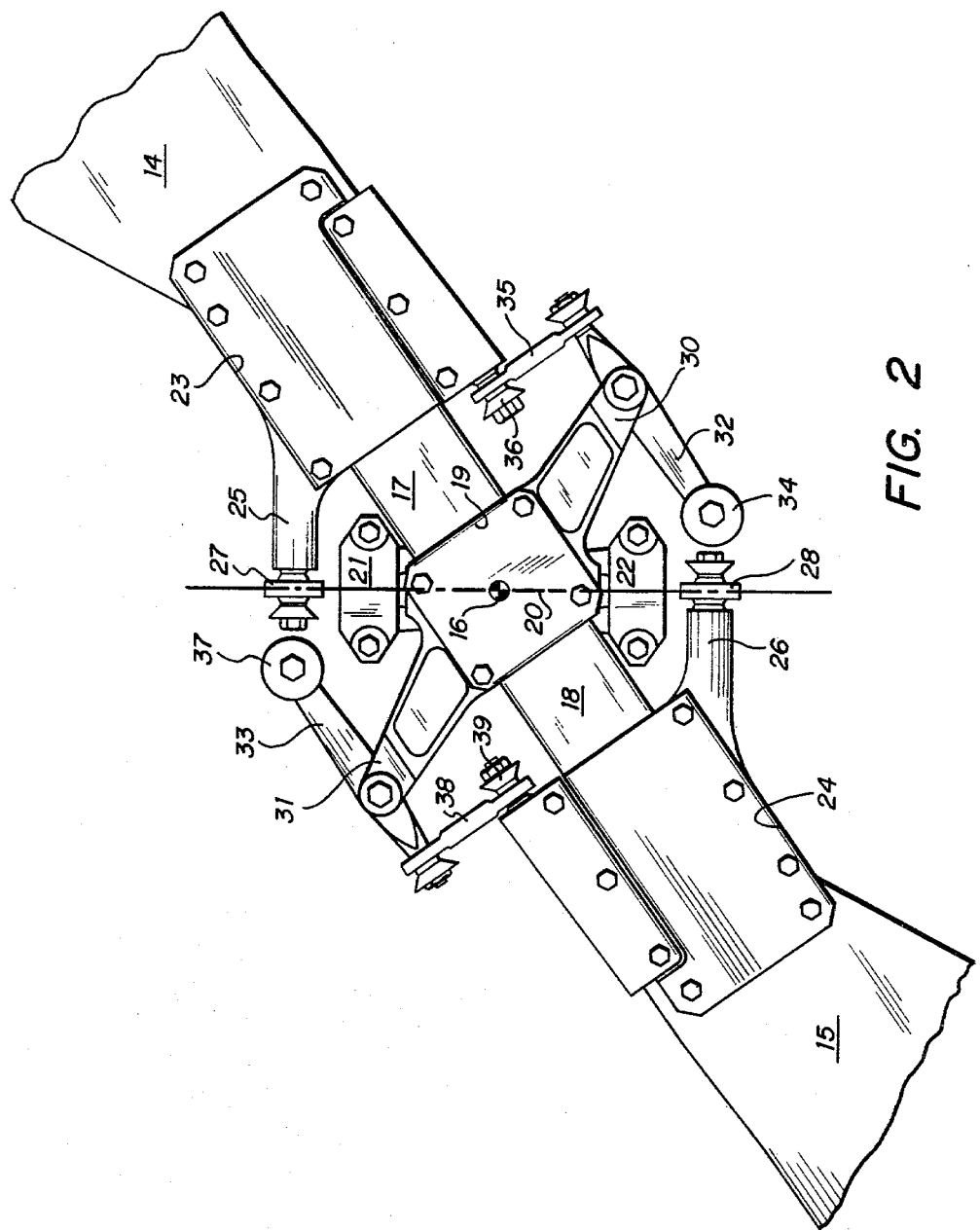
FIG. 2 is an enlarged view of the hub and blade root section of the rotor of FIG. 1.

FIGS. 1 and 2

FIG. 1 illustrates a tail rotor installed on the tail boom 10 of a helicopter at one side of fin 11, 12. A conventional tail mast, not shown, at axis 16 is driven by way of conventional gearing from a shaft 13. Rotor blades 14 and 15 are mounted for rotation about axis 16. Each rotor blade comprises a flat strap of tension-bearing spanwise-extending fibers having twist sections 17 and 18, FIG. 2. The portion between the twist sections is clamped in a hub clamp 19 mounted for teetering action about an axis 20. Preferably, elastomeric bearings 21 and 22 are employed to mount clamp 19 as to teeter on axis 20. The blade includes a one piece hub/flexure/spar structure made of unidirectional fiber strands. Rotor blades 14 and 15 comprise fiber straps which include twist sections 17 and 18 on opposite sides of a central hub section and which extend beyond the twist sections to the tip of blades 14 and 15.

A pitch horn grip 23 is connected at its outboard margin to the root of the blade section 14. A grip 24 is likewise connected to the root section of blade 15. Grips 23 and 24 are hollow and encompass parts of the twist sections 17 and 18 which extend free and unencumbered from hub clamp 19 to the region of the outer margins of grips 23 and 24. No shear reaction bearing is necessary when pitch control is effected in accordance with this invention.

A pitch horn 25 extends from grip 23 and a pitch horn 26 extends from grip 24. In order to provide stability of the tail rotor as it undergoes pitch change, the pitch linkages 27 and 28 are positioned at a negative delta$_3$ location (up flap-up pitch) at points corresponding with the virtual hinges of the twist sections 17 and 18, respectively.

Two struts 30 and 31 form a part of hub clamp 19 and extend outward, generally in the chord planes of the twist sections 17 and 18. An arm 32 is mounted on the end of strut 30. An arm 33 is mounted on the end of strut 31. Arm 32 has a weight 34 on one end thereof and is coupled at the other end thereof by way of a link 35 to a stub shaft 36 which extends inward from the side of grip 23 opposite the pitch horn 25. Similarly, a weight 37 is mounted on arm 33, pivoted at a mid point on strut 31. The opposite end of the arm 33 is coupled by a link 38 to a stub shaft 39 extending inward from the side of grip 24 opposite pitch horn 26.

In operation of the rotor thus far described, the blade will teeter on axis 20. It also undergoes flapping action by beam bending in the twist sections 17 and 18. It also undergoes pitch change by twisting the twist sections 17 and 18 in response to input through the pitch horns 25 and 26. Control input motions are then augmented by forces produced by the centrifugal weights 34 and 37 to reduce pitch link loads by reinforcing any pitch change command through links 35 and 38.

One of the advantages of the construction embodied in the present invention is the provision of the two-bladed rotor with flapping freedom without the necessity of providing shear bearings to react to pitch link loads. Grips 23 and 24 are secured at their outboard margins only to the roots of blade sections 14 and 15, respectively, and form a hollow torque box which encases outboard portions of the twist sections 17 and 18 but do not contact the twist sections.

In the details of blade construction now to be described, it will be seen that the structure permits control of a single two-bladed flapping rotor of simple construction.

FIGS. 3-7

Figure 3:
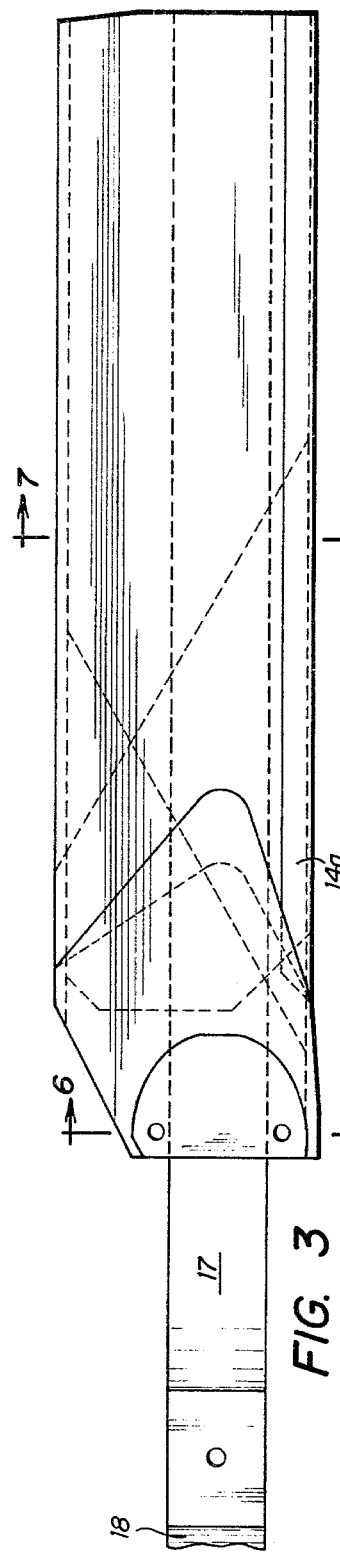
FIG. 3 is a plan view of a portion of the rotor of FIGS. 1 and 2.
Figure 4:
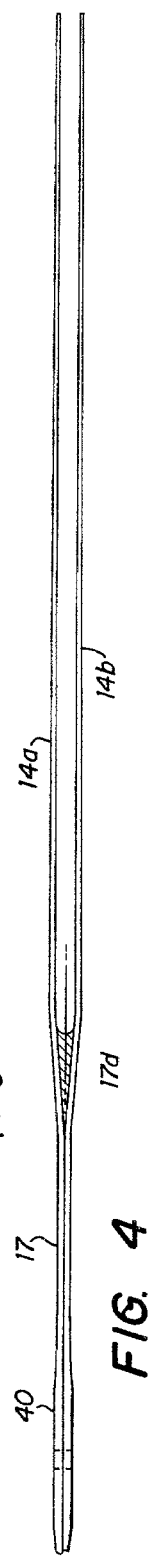
FIG. 4 is a side view of the spar system of the blade of FIGS. 1-3.
Figure 5:
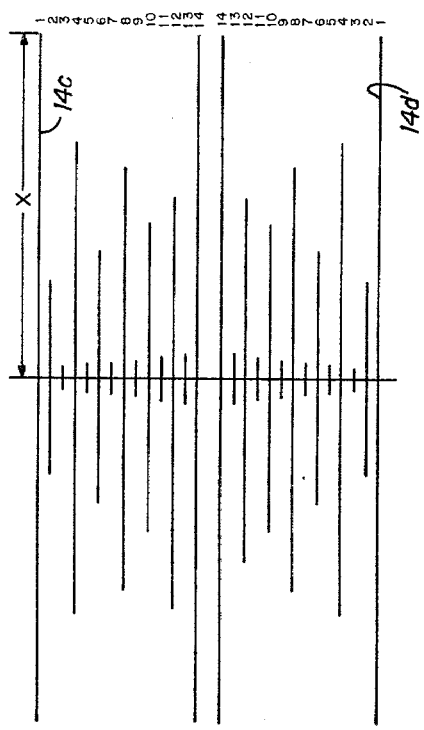
FIG. 5 illustrates the schedule of strap layup sequences.

Referring now to FIG. 3, the blade construction is illustrated without the hub clamp and the grip. More particularly, the particular rotor embodiment illustrated in FIG. 3 has a length of about 62 inches. A flat strap, preferably of fiberglass, forms the twist sections 17 and 18. The straps preferably are of about the same width for the full length of the blade section. As best shown in FIG. 4, the strap has a thickened center section 40 graded into a somewhat thinner twist section 17, and then is divided into approximately half thickness straps to form an upper blade spar 14a and a lower blade spar 14b. Spars 14a and 14b are of graded thickness. A filler wedge or fid 17d, FIG. 4, preferably is formed at the point of division of the fibers to form spars 14a and 14b. Fid 17d preferably is a wedge-shaped body which comprises fibers extending chordwise to prevent splitting at the point of twist. The fiberglass straps forming spars 14a and 14b become progressively thinner as they approach the blade tip. FIG. 5 illustrates a strap layup sequence. It will be noted that the plys are interleaved and are variable in length. The thickened section 40 at the center of the strap is formed by the addition of a plurality of the short layers, FIG. 5, whereas all of the rest of the layers extend through the twist section and then selectively are terminated at points lying beyond grips 23 and 24 and toward the tip of each blade. The outer layers 14c and 14d extend the full length of the blade, and thus form the outer layer of the upper and lower spars 14a 14b. The thickened hub section 40 is thus adapted to be secured in hub clamp 19.

Table I specifies the length of the plys of FIG. 5 numbered from outside to the center. A typical spar layup is indicated in Table I. Note that the top, center, and bottom plys (37.00 inches long) would provide for a 74-inch blade. End sections are trimmed off to form a 62-inch length blade, leaving specimens for test purposes.

TABLE I

| Ply | X |
| --- | --- |
| 1 | 37.00 |
| 2 | 10.60 |
| 3 | 1.43 |
| 4 | 25.60 |
| 5 | 1.59 |
| 6 | 13.60 |
| 7 | 1.76 |
| 8 | 22.60 |
| 9 | 1.98 |
| 10 | 16.60 |
| 11 | 2.33 |
| 12 | 19.60 |
| 13 | 2.68 |
| 14 | 37.00 |

Preferably the spars are made of fiberglass material. Such materials are manufactured by 3M, St. Paul, Minnesota, and identified as SP250SF1, Unidirectional Fiberglass Straps. Individual plys 0.009 inches thick have been found satisfactory. Suitable fiberglass plys are also manufactured and sold by U.S. Polymeric, Santa Clara, Calif., and identified as Catalog No. E735, Fiberglass Cloth.

Other fibrous materials may be employed, such as graphite, Kelvar 49 or laminated metal fibers.

Figure 6:
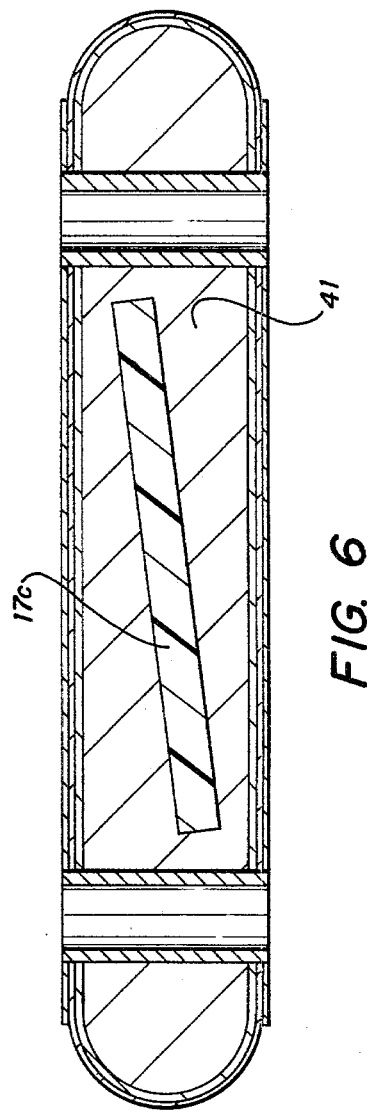
FIG. 6 is a sectional view taken along lines 6—6 of FIG. 3.

FIG. 6 illustrates a section taken through the blade of FIG. 3 along lines 66 and shows the blade root block through which the strap 17 passes before division thereof to form the upper and lower spars 14a and 14b of FIG. 4. The root blocks provide structure to which the grips may be attached. The unitary section 17c, as it passes into the root block 41, is twisted at a small angle, shown to be 8°. Thus, the chord plane of blade sections 14 and 15 are angled in nose-up sense with respect to each other and with respect to the plane of the hub clamp 19.

Figure 7:
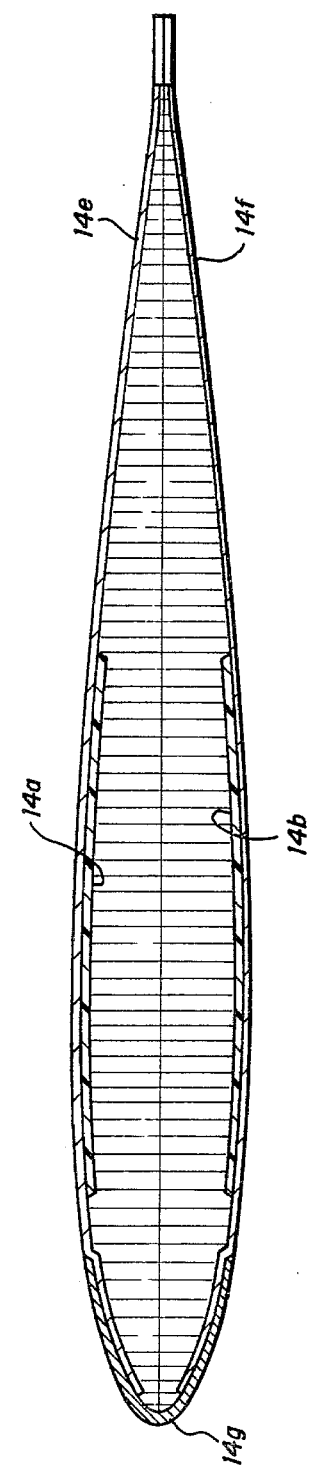
FIG. 7 is a sectional view taken along lines 7—7 of FIG. 3.

FIG. 7 illustrates the blade in section taken along lines 77 of FIG. 3. The spar sections 4a and 14b are integrated into a structure wherein honeycomb body material is provided of a proper shape and over which skins 14e and 14f are secured. A stainless steel abrasive nose spar or strip 14g covers the leading edge of the blade. As shown in FIG. 3, the abrasive strip extends from a point slightly outboard of the root block to the tip of the blade. A helicopter tail rotor characterized by inboard twist sections on opposite sides of a central hub section is provided with pitch horns mounted adjacent to the outboard margins of the flex sections and extend to a negative delta$_3$ connection point located at the virtual bending axis of the twist sections.

Preferably structure is provided for teetering the rotor about a teetering axis on a tail mast where the span axis of the rotor is at an angle of the order of 30° to 45° from a line perpendicular to the teetering axis.

Having described the invention in connection with certain specific embodiments thereof, it is to be understood that further modifications may now suggest themselves to those skilled in the art and it is intended to cover such modifications as fall within the scope of the appended claims.

We claim:

1. A bearingless helicopter tail rotor characterized by inboard twist sections on opposite sides of a central hub section and extending to outboard margins at which a blade grip is attached and which may twist to accommodate pitch inputs to the blade grips, the improvement comprising:

pitch horns mounted adjacent said outboard margins of said twist sections extending to a negative delta$_3$ connection point.

2. The tail rotor set forth in claim 1 including a tail mast structure for teetering said rotor about a teetering axis on said tail mast and wherein the span axis of said rotor is at an angle of the order of 30° to 45° from a line perpendicular to said teetering axis.

3. In a helicopter tail rotor where a thin, flat, tension-bearing strap of spanwise fibers is to be centrally secured by a hub to a helicopter tail mast with twist sections adjacent said hub and substantially equally divided portions of said fibers forming top and bottom blade spars which extend from the outboard margins of said twist sections, the improvement comprising:

(a) blade root blocks, one of said blocks being secured to said strap at each of said margins, and (b) structures including pitch horns, one of said pitch horns extending from each of said margins to a negative delta$_3$ pitch link coupling point.

4. The tail rotor set forth in claim 3 in which said hub includes means for securing said strap for teetering action about an axis from 30° to 45° from a line perpendicular to the span axis of said strap.

5. The tail rotor set forth in claim 3 wherein said structures include portions which are hollow and encircle said twist sections.

6. In a helicopter tail rotor where a thin, flat, tension-bearing strap of spanwise fibers is to be centrally secured by a hub to a helicopter tail mast with twist sections adjacent said hub and substantially equally divided portions of said fibers forming top and bottom blade spars which extend from the outboard margins of said twist sections, the improvement comprising:

(a) blade root blocks, one secured to said strap at about each of said margins, (b) hollow grips, one supported by said strap at each of said margins and extending inboard to encompass at least part of each of said twist sections, and (c) pitch horns, one extending from each of said grips to a negative delta$_3$ pitch link coupling point.

7. In a helicopter tail rotor where a thin, flat, tension-bearing strap of spanwise fibers is to be centrally secured to a hub of a helicopter tail mast and extend from the axis of said mast as twist sections beyond which top and bottom spars extend as substantially equally divided portions of said fibers with airfoil structures having said spars integrated therein beyond said twist sections and with said twist sections bendable relative to a virtual hinge axis, the improvement comprising:

(a) blade root blocks installed in root portions of said airfoil structures adjacent to the outboard margins of said twist sections, and (b) structures including grip means secured to said blocks and extending clear of said twist sections in negative delta$_3$ sense to pitch horn-pitch link coupling points, said structure being shaped to assure bearingless twist and flapping motion of said twist sections.

* * * * *

UNITED STATES PATENT AND TRADEMARK OFFICE
CERTIFICATE OF CORRECTION

PATENT NO. : 4,349,316

DATED : September 14, 1982

INVENTOR(S) : Charles W. Hughes et al.

It is certified that error appears in the above-identified patent and that said Letters Patent is hereby corrected as shown below:

Column 4, line 2, "Kelvar" should read -- Kevlar --

Column 4, line 15, "4a" should read -- 14a --.

Signed and Sealed this

Fifteenth Day of March 1983

[SEAL]

Attest:

GERALD J. MOSSINGHOFF

Attesting Officer

Commissioner of Patents and Trademarks